United States Patent
Shah et al.

(10) Patent No.: US 7,457,877 B1
(45) Date of Patent: *Nov. 25, 2008

(54) SYSTEM AND METHOD FOR MEASURING ROUND TRIP TIMES IN A NETWORK USING A TCP PACKET

(75) Inventors: Dhaval N. Shah, Santa Clara, CA (US); Virupaksh Honnur, Sunnyvale, CA (US); Dalen D. Bosteder, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 641 days.

This patent is subject to a terminal disclaimer.

(21) Appl. No.: 11/076,389

(22) Filed: Mar. 8, 2005

Related U.S. Application Data

(63) Continuation of application No. 10/214,797, filed on Aug. 7, 2002, now Pat. No. 7,143,184, which is a continuation of application No. 09/087,689, filed on May 26, 1998, now Pat. No. 6,446,121.

(51) Int. Cl.
*G06F 15/173* (2006.01)
(52) U.S. Cl. ........................................ 709/226; 709/224
(58) Field of Classification Search ......... 709/230–241, 709/223–224, 227–228, 203, 226; 370/229–235, 370/237–238
See application file for complete search history.

(56) References Cited

U.S. PATENT DOCUMENTS

| | | | |
|---|---|---|---|
| 5,341,477 A | 8/1994 | Pitkin et al. ................. 709/226 |
| 5,430,727 A | 7/1995 | Callon ..................... 370/85.13 |
| 5,450,394 A | 9/1995 | Gruber ........................ 370/253 |
| 5,459,837 A | 10/1995 | Caccavale .................. 709/226 |
| 5,477,531 A | 12/1995 | McKee et al. ................. 370/17 |
| 5,509,123 A | 4/1996 | Dobbins et al. ......... 395/200.15 |
| 5,521,907 A * | 5/1996 | Ennis et al. ................. 370/253 |
| 5,812,528 A | 9/1998 | VanDervort ................. 370/235 |
| 5,819,089 A | 10/1998 | White ........................ 395/676 |

(Continued)

OTHER PUBLICATIONS

"Cisco Distributed Director", 1996, Cisco Systems, Inc.

(Continued)

*Primary Examiner*—Salad Abdullahi
(74) *Attorney, Agent, or Firm*—Baker Botts L.L.P.

(57) ABSTRACT

An embodiment of the present invention is a system and method for measuring round trip times in a network, such as the Internet, by utilizing a packet, such as a transmission control protocol (TCP) packet. The TCP packet may be a packet which is typically utilized during establishment of a reliable connection, such as a SYN or a SYN ACK. According to an embodiment of the present invention, a mirrored service is selected for a client by sending the TCP packet from an approximate location of each of the mirrored service to an approximate location of the client. A response is then received by each mirrored service from the approximate location of the client, and a round trip time for each mirrored service is measured from the time the TCP packet was sent to the time the response was received. The various round trip times of each mirrored service are compared with each other and a best round trip time, such as the shortest time, is selected. A mirrored service associated with the best round trip time is selected for use with the client.

14 Claims, 6 Drawing Sheets

U.S. PATENT DOCUMENTS

| | | | | |
|---|---|---|---|---|
| 5,870,557 | A | 2/1999 | Bellovin et al. | 709/224 |
| 5,894,556 | A | 4/1999 | Grimm et al. | 709/227 |
| 5,905,871 | A | 5/1999 | Buskens et al. | 709/245 |
| 5,917,820 | A | 6/1999 | Rekhter | 370/392 |
| 5,918,017 | A | 6/1999 | Attanasio et al. | 395/200.54 |
| 5,983,265 | A | 11/1999 | Martino, II | 709/206 |
| 5,991,809 | A | 11/1999 | Kriegsman | 709/226 |
| 6,003,079 | A | 12/1999 | Friedrich et al. | 709/224 |
| 6,006,264 | A | 12/1999 | Colby et al. | 709/226 |
| 6,009,081 | A | 12/1999 | Wheeler et al. | 370/255 |
| 6,018,516 | A | 1/2000 | Packer | 370/231 |
| 6,023,733 | A | 2/2000 | Periasamy et al. | 709/241 |
| 6,031,846 | A | 2/2000 | Gurusami et al. | 370/508 |
| 6,041,352 | A * | 3/2000 | Burdick et al. | 709/224 |
| 6,070,190 | A | 5/2000 | Reps et al. | 709/224 |
| 6,078,590 | A | 6/2000 | Farinacci et al. | 370/432 |
| 6,078,956 | A * | 6/2000 | Bryant et al. | 709/224 |
| 6,088,717 | A | 7/2000 | Reed et al. | 709/201 |
| 6,101,180 | A | 8/2000 | Donahue et al. | 370/352 |
| 6,115,752 | A * | 9/2000 | Chauhan | 709/241 |
| 6,118,765 | A * | 9/2000 | Phillips | 370/235 |
| 6,286,045 | B1 * | 9/2001 | Griffiths et al. | 709/224 |
| 6,317,775 | B1 * | 11/2001 | Coile et al. | 709/201 |
| 6,446,121 | B1 * | 9/2002 | Shah et al. | 709/224 |
| 6,578,066 | B1 * | 6/2003 | Logan et al. | 718/105 |

OTHER PUBLICATIONS

Chapter 2.2 PING of TCP RCF 1739-www.ietf.org, 1739 text, Dec. 1994.

Bolosky, William 1. et al, "Distributed Schedule Management in the Tiger Video Fileserver", p. 213-223, ACM Symposium on Operating Systems Principles, Oct. 1997, Saint Malo, France.

Dillon, Kevin, "PNNI: Effortless Expansion for ATM Networks", Dialog (r) File 647, ATM Forum Bay Networks, Nov. 7, 1998.

Gobrial, Margaret N., "Evaluation of Border Gateway Protocol (BGP) Version 4 (V4) In the Tactical Environment", Oct. 21-24, 1996 Military Communications Conference, 1996.

Halabi, Bassam, Internet Routing Architectures (CISCO) Macmillan Technical Publishing, Apr. 23, 1997.

IBM Redbooks, "Setting Up and Implementing ADST AR Distributed Storage Manager/400", Apr. 3, 1995.

Kosiur, IP Multicasting: The Complete Guide to Interactive Corporate Networks. Wiley Computer Publishing, Apr. 1, 1998.

Liu, Zhao, et al, "A Scalable Wireless Virtual LAN", International Conf. On Mobile Computing and Networking, Nov. 11-12, 1996 White Plains, NY.

Morrissey, Peter, "Multihoming with BGP4", Network Computing, 1999, No. 1025, p. 117.

Shiner, Mitchell, Scott Meuller Library-Computer Dictionary, Que, Macmillan Computer Publishing, May 20, 1998.

Smith, Bradley R., et al, "Securing the Border Gateway Routing Protocol", Global Telecommunications Conference, 1996, Nov. 18-22, 1996.

Tsuchiya, Paul F., "Internet Routing over Large Public Data Networks using Shortcuts", Bellcore, tsuchiya@thumper.bellcore.com, 1992.

Inan, Kemal, "Supervisory Control and the Gateway Problem", Jun. 4, 1993, IEEE Colloquium on Discrete Event Systems.

* cited by examiner

SYSTEM AND METHOD FOR MEASURING ROUND TRIP TIMES IN A NETWORK USING A TCP PACKET

CROSS REFERENCE TO RELATED APPLICATIONS

This application is a continuation of U.S. application Ser. No. 10/214,797, filed Aug. 7, 2002, now U.S. Pat. No. 7,143,184 by Dhaval N. Shah, et al. and entitled "System and Method for Measuring Round Trip Times in a Network Using a TCP Packet," which is a continuation of U.S. application Ser. No. 09/087,689, filed May 26, 1998, by Dhaval N. Shah, et al. and entitled "System and Method for Measuring Round Trip Times in a Network Using a TCP Packet," now U.S. Pat. No. 6,446,121.

FIELD OF THE INVENTION

The present invention relates to accessing data in a network environment, such as the Internet, via a computer system. In particular, the present invention relates to a system and method for selecting a host by selecting a best round trip time between a server and a client.

BACKGROUND OF THE INVENTION

With the growing popularity of the Internet, providing speedy access to a requested location on the Internet is fast becoming a significant issue. For example, when a popular web page is hosted by a single computer, the Internet traffic to that computer can be overwhelming. To manage this problem, several computers can be utilized to host the same web page such that each hosting computer, typically referred to as a server, maintains a copy of the web page. If there are many servers at the same location, then the network connection to that location can become choked during a time of high Internet traffic. To avoid choking the network connection, mirrored servers are often located at different sites. These sites are herein referred to as mirrored sites. The use of multiple computers to host a network service, such as a web page, is typically referred to as mirrored services.

FIG. 1 is a block diagram illustrating a path taken by a client's request for a particular address. A client may be any entity which attempts to access a service. For example, the client may be a user, company, or an automated computer system. FIG. 1 shows a client 10 requesting an address for a network site, such as www.cisco.com, from a local domain name server 12. The client's local domain name server 12 may be a service such as Netcom or AT&T. The local domain name server 12 then eventually learns the address of one of the mirrored services 14A-14B, and replies to the client 10 with the address of one of the mirrored services 14A-14B.

FIG. 2 illustrates a basic organization of the Internet. The Internet includes groups of networks and routers which combine to create an autonomous system (AS) 50A-50E. A client may be located in one AS, such as AS 50A, while the service which the client is attempting to access may be located in another AS, such as AS 50E. In order to reach service 14, the request from client 10 may be passed from AS 50A to AS 50B through AS 50C, through AS 50D, and finally reaching service 14 at AS 50E.

In a mirrored service environment, the client 10 may be in one AS, such as AS 50A, while the mirrored services may be located in various different autonomous systems, such as AS 50E and AS 50C. An address of one of these mirrored services is typically needed in response to the client's request.

There are several conventional ways of determining which mirrored service should be assigned to a requesting client. A selection of a mirrored service can be based on several factors. Ideally, the requested address should be returned to the client very quickly and download into the client's computer system as quickly as possible. The time between the request being sent out by the client and the address being received is referred to as latency. The time it takes to download the requested data is typically determined by the band width.

One conventional service assignment scheme is a load balancing named (LB named) system scheme. In this scheme, it is determined how many clients are being served by each mirrored services. A new client is routed to the mirrored service with the least load. The load is determined by the number of clients accessing the service at a given time and the power of the server. A possible problem with the LB named scheme is that although it factors load balancing, the scheme is indifferent to the location of the client. The location of the client is typically a factor in determining latency. If the user is very far from the assigned service, then it will typically take longer to access that service than if the user was very close to the service. Accordingly it is preferred to assign the mirrored service closest to the client's location.

Another conventional service assignment scheme is the round robin scheme. The round robin simply takes turns on which mirrored service is to be used. A potential problem with the round robin scheme is that it does not take into consideration the various loads of the mirrored services at any given time. Additionally, the round robin scheme also fails to take into consideration the location of the user. Accordingly, the two factors of latency and band width are not typically considered in the round robin scheme.

When the service is a mirrored service, the mirrored services may be located in different autonomous systems. Some service selection methods attempt to measure the metric between the client 10 and each of the services 14. Metric is used herein to include a measurement of a unit which indicates distance or time. For example, one such method measures 'hop count', wherein the number of autonomous systems located between client 10 and service 14 are counted. The mirrored service with the smallest hop count is considered the best selection for that particular client.

Although the metric measurement methods are effective in many situations, there may be situations in which it is an advantage to have an alternate method for determining which mirrored service is best for a particular client. For example, one such situation is if the hop count between a client and a first server is the same as the hop count between the client and a second server. Although the hop count may be the same, the actual distances between the client and the first service and the client and the second service may be different. Another example of when an alternative method would be beneficial, is when an autonomous system is so large as to encompass more than one mirrored service. A client within that same autonomous system would not be able to use the hop count in order to determine which mirrored service is better for that client.

It would be desirable to have an alternative reliable method to determine which mirrored service is the best selection for a given client. The present invention addresses such a need.

SUMMARY OF THE INVENTION

An embodiment of the present invention is a system and method for measuring round trip times in a network, such as the Internet, by utilizing a packet, such as a transmission control protocol (TCP) packet. The TCP packet may be a packet which is typically utilized during establishment of a reliable connection, such as a SYN or a SYN ACK. According to an embodiment of the present invention, a mirrored service is selected for a client by sending the TCP packet from an approximate location of each of the mirrored service to an approximate location of the client. A response is then received by each mirrored service from the approximate location of the client, and a round trip time for each mirrored service is measured from the time the TCP packet was sent to the time the response was received. The various round trip times of each mirrored service are compared with each other and a best round trip time, such as the shortest time, is selected. A mirrored service associated with the best round trip time is selected for use with the client.

A method according to an embodiment of the present invention for measuring round trip time in a network is presented. The method comprises sending a packet at a first time to an approximate location of a client, wherein the packet is of a type which may be used to establish a reliable connection; receiving a reply to the packet at a second time; and measuring a round trip time from the first time to the second time.

In another aspect of the invention, a system according to an embodiment of the present invention for measuring round trip time in a network is presented. The system comprises a means for sending a packet at a first time to an approximate location of a client, wherein the packet is of a type which may be used to establish a reliable connection; a means for receiving a reply to the packet at a second time; and a means for measuring a round trip time from the first time to the second time.

In yet another aspect of the invention, a system according to an embodiment of the present invention for measuring a round trip time in a network is disclosed. The system comprises a directing device configured to receive a plurality of round trip times and select a best round trip time. The system also comprising an agent device coupled to the directing device, the agent device being configured to derive a first round trip time by utilizing a packet, wherein the packet is of a type which may be used to establish a reliable connection, the agent also being configured to send the first round trip time to the directing device.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
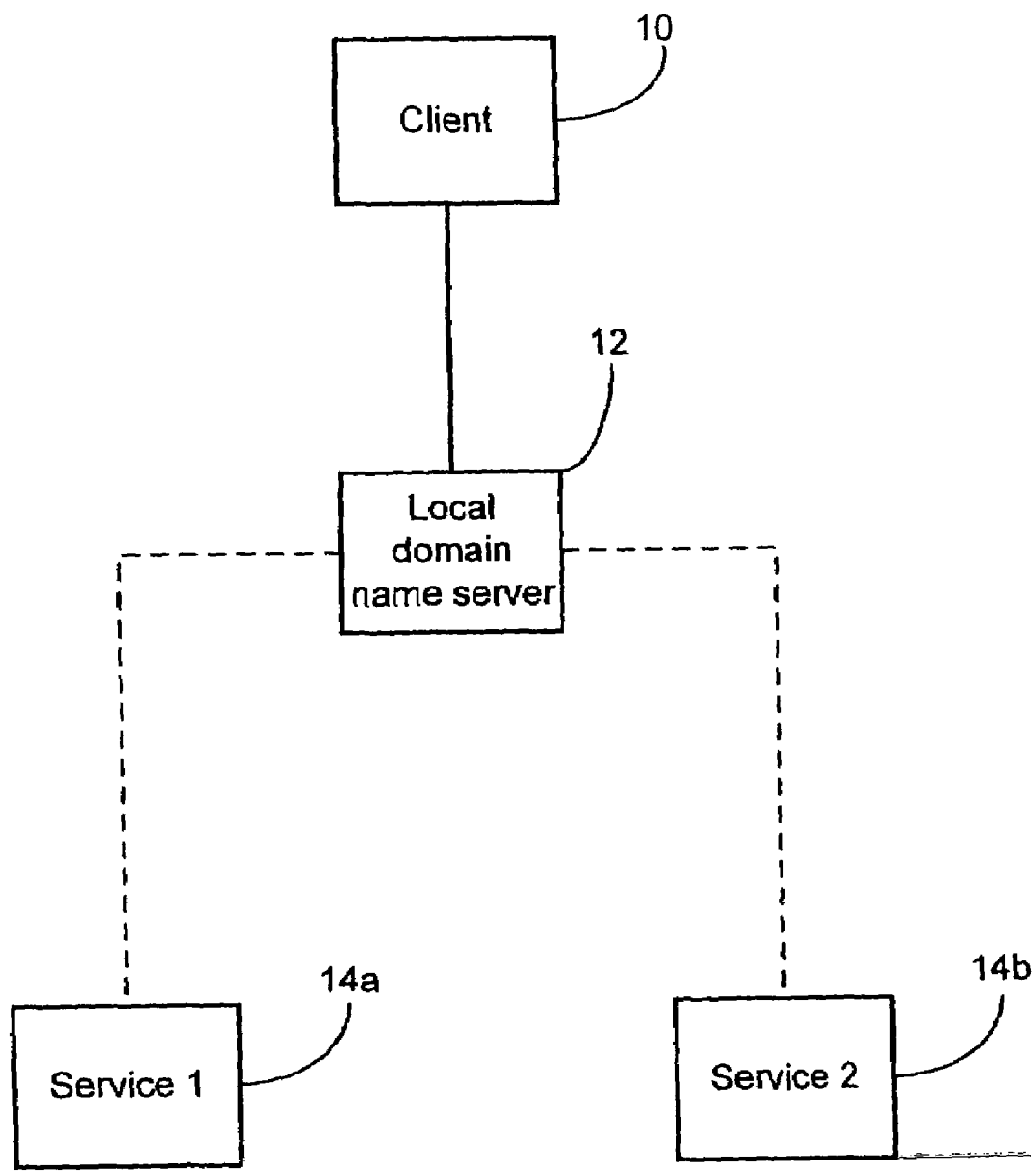
FIG. 1 is a block diagram illustrating a path taken by a user's request for a particular address.
Figure 2:
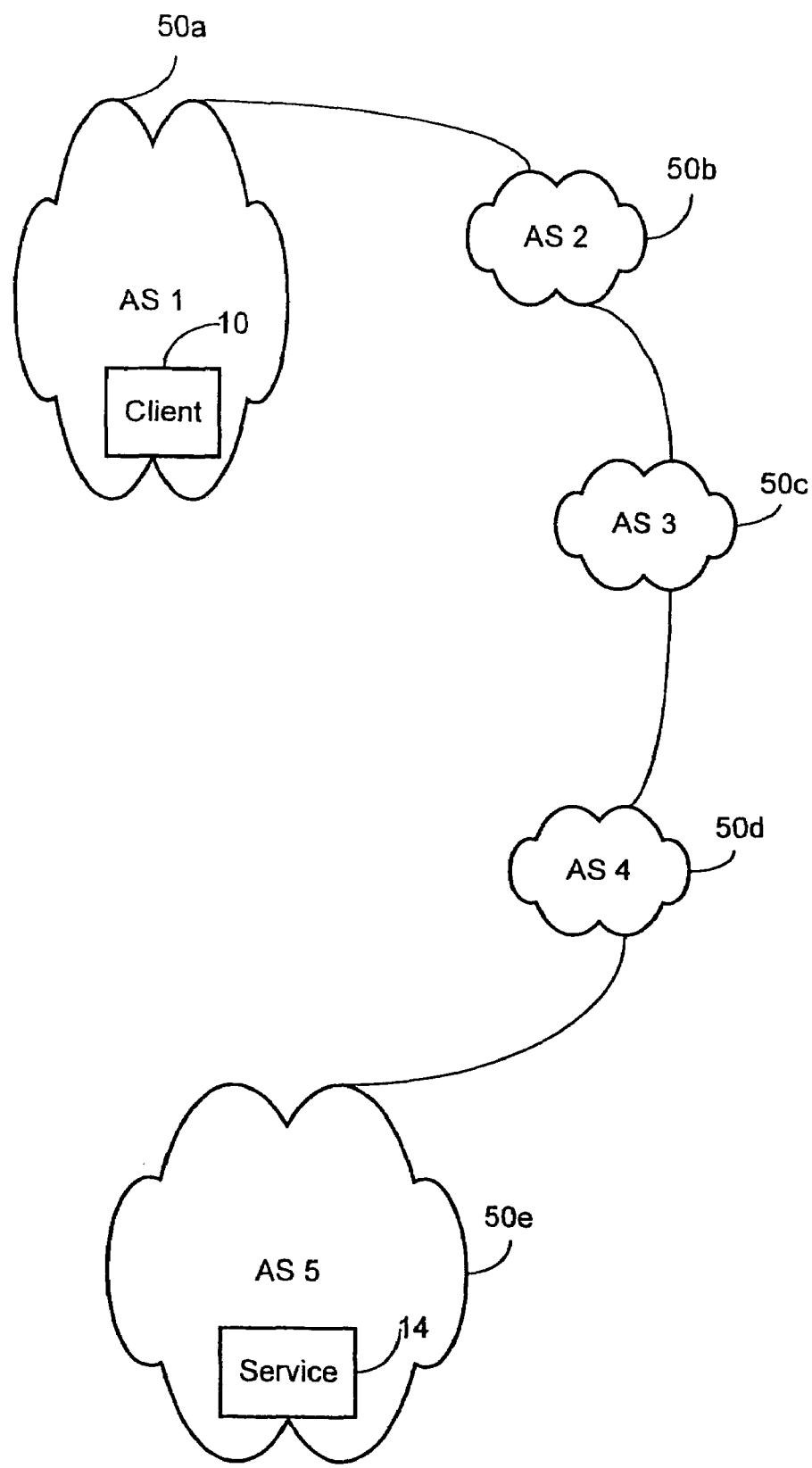
FIG. 2 is an illustration of a basic organization of the Internet.
Figure 3:
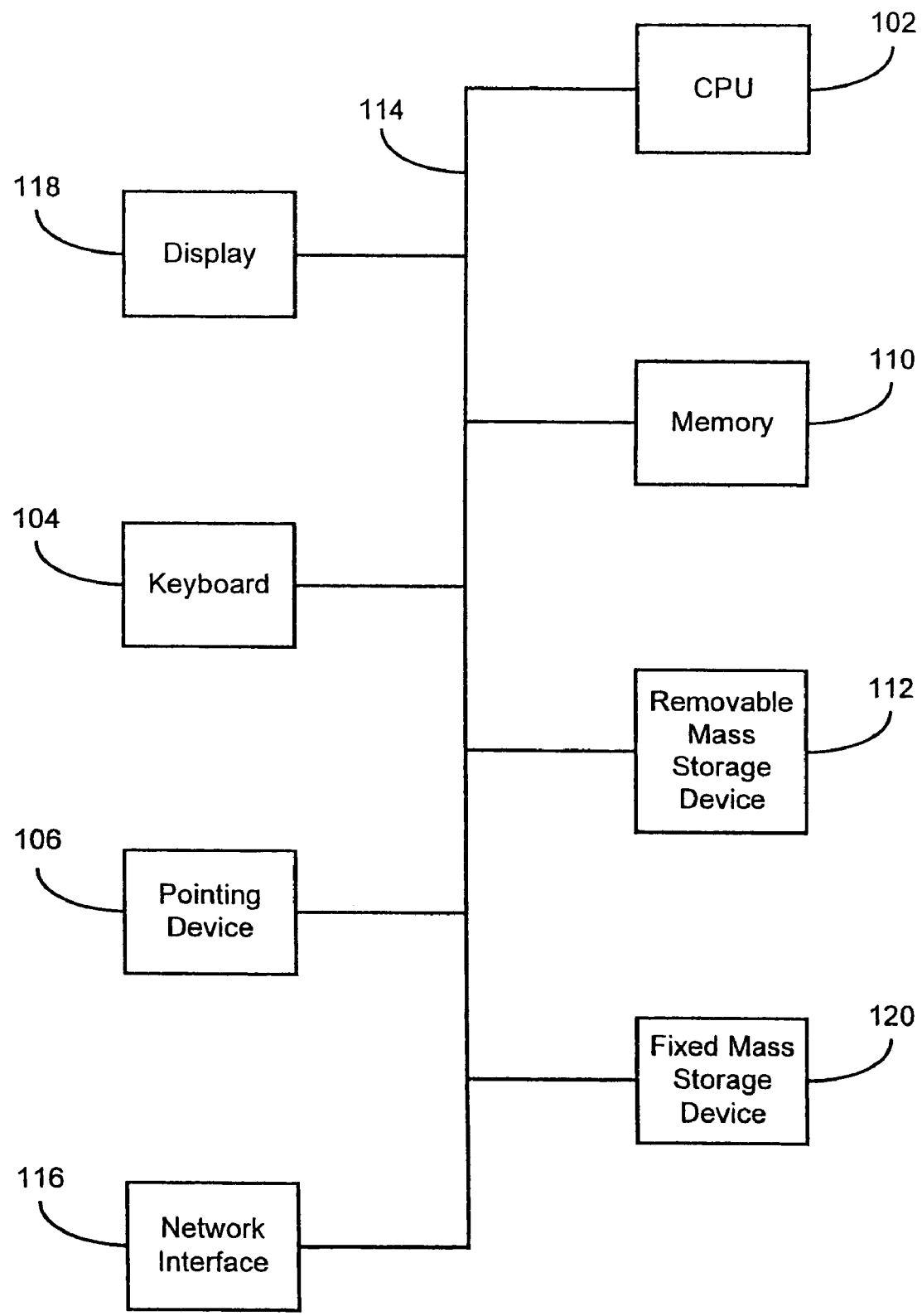
FIG. 3 is a block diagram of a computer system suitable for implementing the present invention.

FIG. 3 is a block diagram of a general purpose computer system 100 suitable for carrying out the processing in accordance with one embodiment of the present invention. FIG. 3 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, bus 114 is illustrative of any interconnection scheme serving to link the subsystems. The computer system shown in FIG. 3 is but an example of a computer system suitable for use with the invention. Other computer architectures having different configurations of subsystems may also be utilized.

Figure 4:
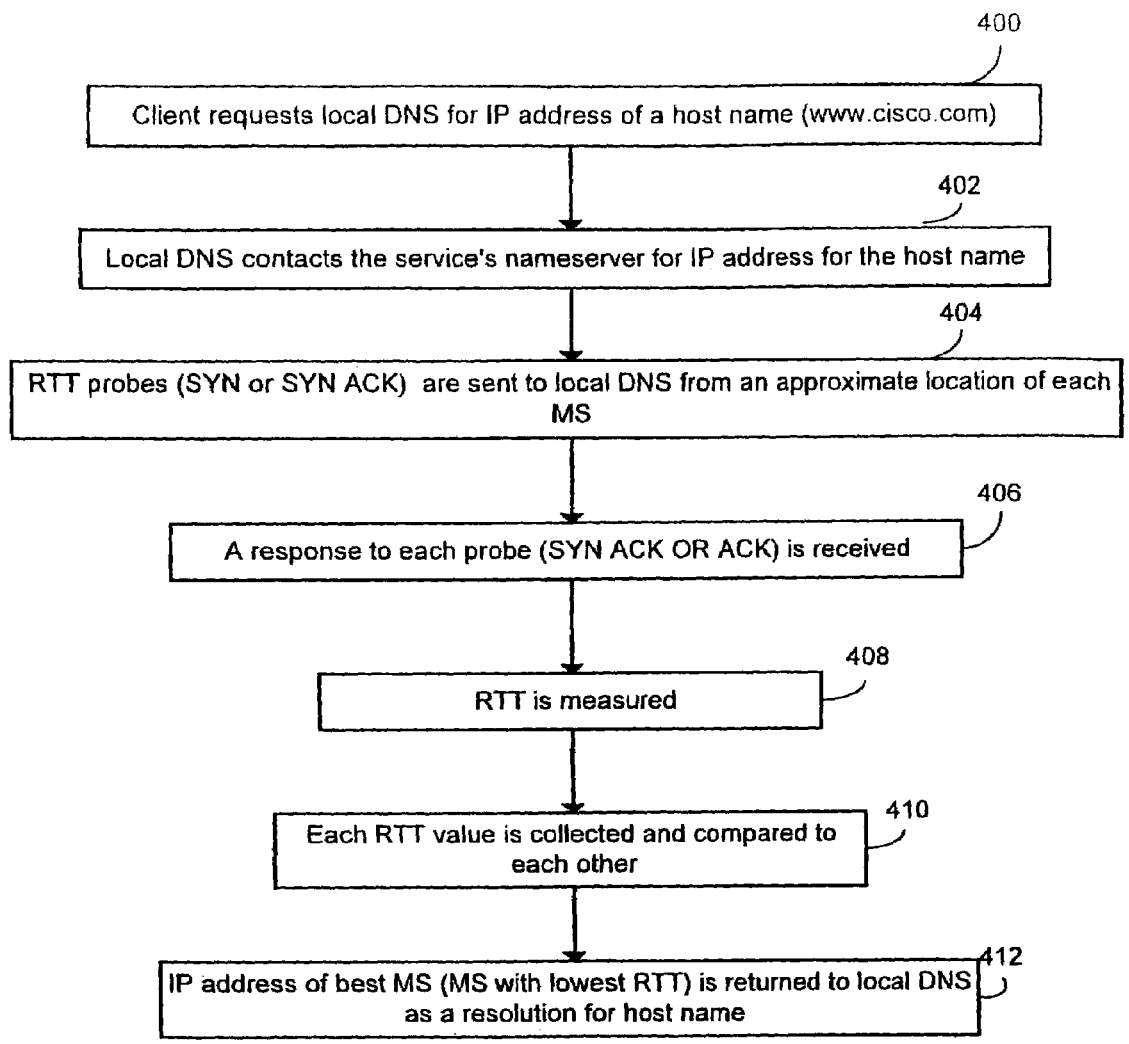
FIG. 4 is a flow diagram of a method according to an embodiment of the present invention for measuring round trip times in a network.

FIG. 4 is a flow diagram of a method according to an embodiment of the present invention for measuring round trip time in a network. According to the flow diagram of FIG. 4, a client requests a local domain name server (DNS) for an Internet protocol (IP) address of a host name, via step 400. An example of a host name may be www.cisco.com. The local DNS may then contact the requested services name server for the requested IP address for the host name, via step 402. Round trip time (RTT) probes are then sent to the local DNS from an approximate location of each mirrored service, via step 404. The RTT probes are preferably TCP packets which are commonly used for purposes of establishing a reliable connection between two points in a network. Examples of such TCP packets include a SYN, SYN ACK, or RST.

A response to each probe is then received, via step 406. Since the initial RTT probes sent to the local DNS are normally used during establishment of a reliable connection, a response is expected. For example, these packets are typically used in establishing a reliable connection in the following manner. A first computer sends a SYN packet to a second computer. When the second computer receives the SYN packet, it returns a SYN ACK packet to the first computer. When the first computer receives the SYN ACK packet, it returns an ACK packet to the second computer. This manner of establishment of a reliable connection is typically referred to as a "three-way handshake". TCP RFC (RFC-793) standard specifies that unsolicited TCP SYN ACKis are to be responded with a TCP Reset (RST). Accordingly, if an unsolicited SYN ACK is sent to the local DNS, then an RST is expected to be returned. Alternatively, if a SYN packet is sent to the local DNS, then a SYN ACK is expected to be returned.

Once the response to each probe is received by each mirrored service, via step 406, a round trip time is measured for each mirrored service, via step 408. The round trip time value for each mirrored service is collected and compared with other round trip time value of the other mirrored services, via step 410. The IP address of a best mirrored service, such as the mirrored associated the lowest RTT is then returned to the local DNS as a resolution for the requested host name, via step 412.

Figure 5:
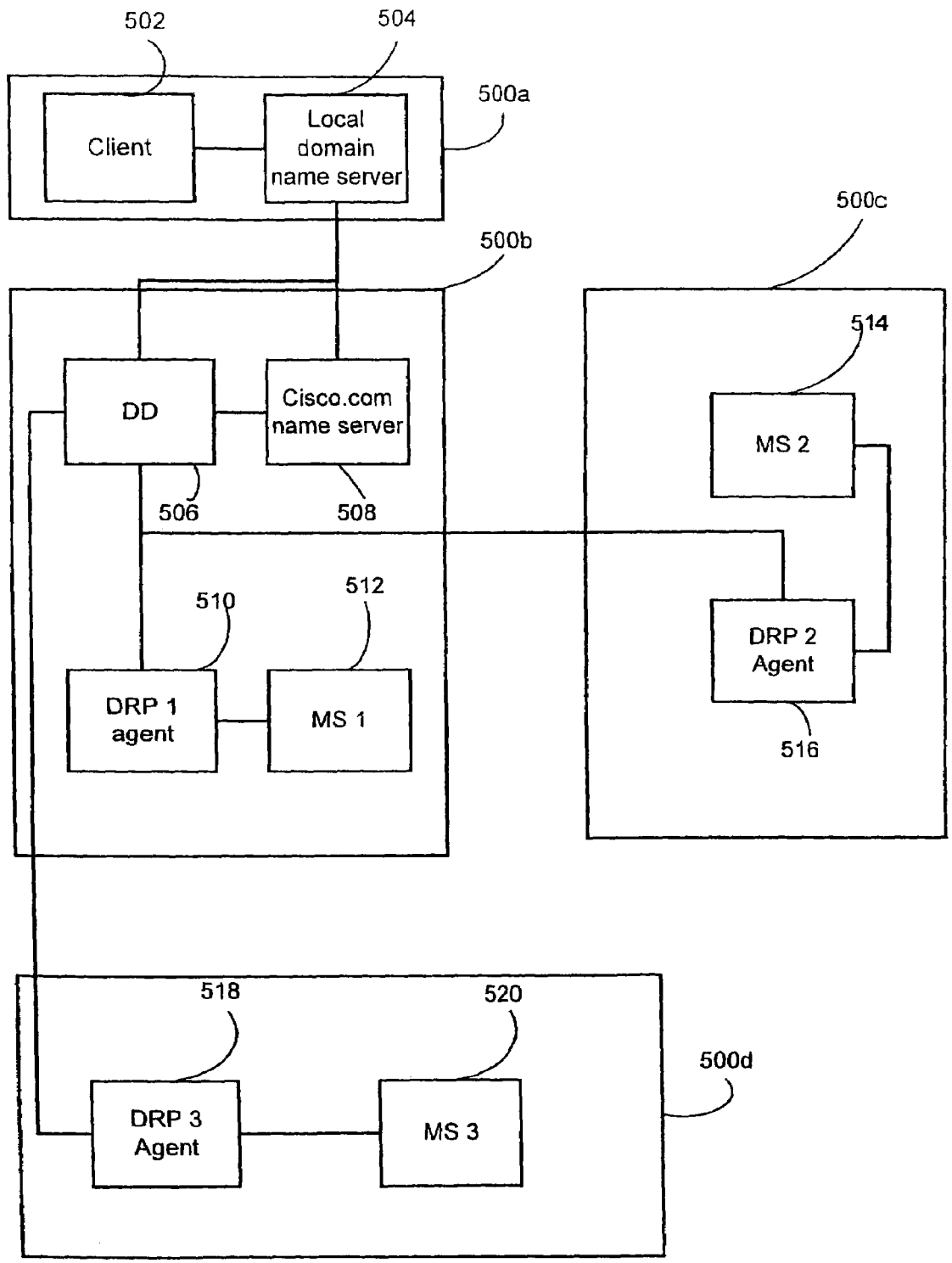
FIG. 5 is a block diagram of a system according to an embodiment of the present invention for measuring round trip times in a network.

FIG. 5 is a block diagram of a system according to an embodiment of the present invention for measuring round trip times in a network. FIG. 5 shows autonomous systems 500A-500D. A client 502 is shown to be coupled to a local domain server 504 within autonomous system 500A. In this example, the client 502 requests the IP address of a host name, such as www.cisco.com. The clientis request is sent to the local domain name server 504, which in turn eventually sends a request to the host name server 508.

In this example, the host name server is cisco.com name server. The host name server 508 may be located in a separate autonomous system, such as autonomous system 500B. The host name server 508 then interacts with a distributed director 506 and a director response protocol agent 510 in order to determine which mirrored service 512, 514, or 520, is the best selection to respond to the clientis request. The distributed director 506 may be any device which transparently directs a client to the best mirrored service. An example of such a distributed director is Distributed Director model #4700m, or Distributed Director model #2500m, both of which are manufactured by Cisco Systems, Inc. The director response protocol agent 510 may be any device which can transparently measure or calculate round trip times. Examples of such a device include Cisco 7500 Router, Cisco 7200 Router, Cisco 4700 Router, and Cisco 2500 Router, all of which are manufactured by Cisco Systems, Inc. "Transparent" is herein meant to indicate a process which is not seen by a user.

The distributed director 506 then sends a request to each DRP agent 510, 516, and 518 in the various autonomous systems 500B-500D in which the mirrored services 512, 514, and 520 are located. The distributed director 506 requests of each DRP agent 510, 518, 516, what their round trip times are for client 502. Each DRP agent 510, 516, 518, then sends a RTT probe to an approximate location of the client 502, such as to the local domain server 504. The local domain name server 504 then replies to the RTT probe back to the DRP agents 510, 516, and 518. DRP agents 510, 516, 518 can then each calculate its own RTT. Each DRP agent 510, 516, 518, then replies to the distributed director 506 with its own RTT. The distributed director 506 can then compare the various RTTis and determine the best mirrored service. An example of a best mirrored service is the mirrored service with the lowest round trip time. The distributed director 506 can then reply to the local domain name server 504 with an IP address for the best mirrored service.

Figure 6:
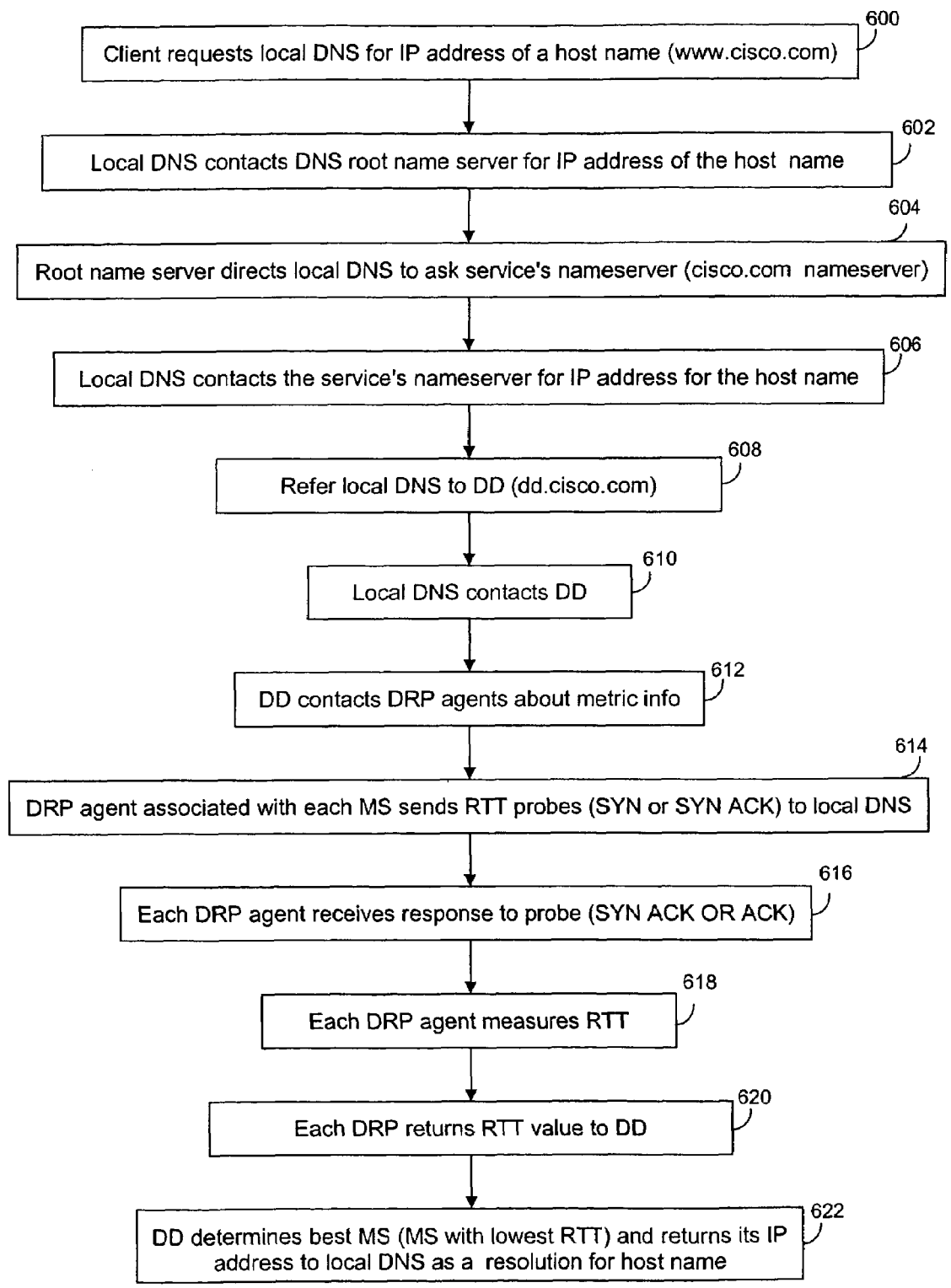
FIG. 6 is another flow diagram of a method according to an embodiment of the present invention for measuring round trip times in a network.

FIG. 6 is another flow diagram of a method according to an embodiment of the present invention for measuring round trip times in a network. As previously discussed, the client requests the local domain name server for an IP address of a host name, such as www.cisco.com, via step 600. The local domain name server then contacts a domain name server route name server for an IP address of the host name, via step 602. It is common for local domain name servers to contact a root name server for further direction. Root name servers and their uses are well known in the art.

The root name server then directs the local domain name server to ask the requested service's name server, such as cisco.com name server, via step 604. The local domain name server then contacts the service's name server for an IP address of the host name, via step 606. The local domain name server is then referred to the distributed director, for example to dd.cisco.com, via step 608. The local domain name server then contacts the distributed director, via step 610. The distributed director then contacts the distributed response protocol (DRP) agents, located near the various mirrored servers, regarding metric information, via step 612. Metric information can include distance information as well as time information.

Each DRP agent associated with a mirrored service sends a round trip time probe to the local domain name server, via step 614. As previously stated, the RTT probes are packets which are normally used during the establishment of a reliable connection between two points in a network, such as the Internet. Examples of these TCP packets include SYN, and SYN ACK.

Each DRP agent then receives a response to its RTT probe, via step 616. If an unsolicited SYN ACK was sent, then a Reset (RST) is expected to be returned.

Each DRP agent then measures its own round trip time, via step 618. Each DRP agent then returns its round trip time value to the distributed director, via step 620. The distributed director then determines a best mirrored service, such as a mirrored service with the lowest round trip time, and returns its IP address to the local domain name server as a resolution for the requested host name, via step 622.

A method and system for measuring round trip time in a network using a TCP packet has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for responding to a request for an address, comprising:
    receiving, from a source, a request for an address associated with a host name;
    identifying a plurality of mirrored websites associated with the host name;
    communicating a query to one or more of the mirrored websites that requests a round trip time determination for sending a message from the mirrored website to the source;
    receiving from one or more of the mirrored websites the round trip time determination; and
    selecting one of the plurality of mirrored websites based at least in part on one or more of the round trip time determinations;
    wherein the query requests that the mirrored websites determine the round trip time by:
        sending a first data packet from the mirrored web site to the source;
        receiving from the source a second data packet in response to the first data packet; and
        determining the difference between the time the first data packet was sent and the time the second data packet was received; and
    wherein a TCP network communication protocol is used, the first data packet comprising an unsolicited SYN ACK packet and the second data packet comprising a reset (RST) packet.

2. The method of claim 1, wherein the request is received from a host name server that is coupled to a domain name server (DNS).

3. The method of claim 1, further comprising:
    directing a client associated with the source to a mirrored service associated with a selected one of the round trip determinations.

4. The method of claim 1, further comprising:
    transparently directing a client associated with the source to a mirrored service associated with a selected one of the round trip determinations.

5. The method of claim 1, further comprising:
    responding to a communication from a DNS by providing an Internet Protocol (IP) address of a mirrored service associated with a selected one of the mirrored websites.

6. A system for responding to a request for an address, comprising:
    means for receiving, from a source, a request for an address associated with a host name;
    means for identifying a plurality of mirrored websites associated with the host name;
    means for communicating a query to one or more of the mirrored websites that requests a round trip time determination for sending a message from the mirrored website to the source;
    means for receiving from one or more of the mirrored websites the round trip time determination; and
    means for selecting one of the plurality of mirrored websites based at least in part on one or more of the round trip time determinations;
    wherein the query requests that the mirrored websites determine the round trip time by:
        sending a first data packet from the mirrored web site to the source;

receiving from the source a second data packet in response to the first data packet; and determining the difference between the time the first data packet was sent and the time the second data packet was received; and wherein a TCP network communication protocol is used, the first data packet comprising an unsolicited SYN ACK packet and the second data packet comprising a reset (RST) packet.

7. The system of claim 6, further comprising:

means for directing a client associated with the source to a mirrored service associated with a selected one of the round trip determinations.

8. The system of claim 6, further comprising:

means for responding to a communication from a domain name server (DNS) by providing an Internet Protocol (IP) address of a mirrored service associated with a selected one of the mirrored websites.

9. An apparatus for responding to a request for an address, comprising:

a distributed director element operable to receive, from a source, a request for an address associated with a host name, wherein the distributed director element is operable to:

identify a plurality of mirrored websites associated with the host name;

communicate a query to one or more of the mirrored websites that requests a round trip time determination for sending a message from the mirrored website to the source;

receive, from one or more of the mirrored websites, the round trip time determination; and select one of the plurality of mirrored websites based at least in part on one or more of the round trip time determinations;

wherein the query requests that the mirrored websites determine the round trip time by:

sending a first data packet from the mirrored web site to the source;

receiving from the source a second data packet in response to the first data packet; and determining the difference between the time the first data packet was sent and the time the second data packet was received; and wherein a TCP network communication protocol is used, the first data packet comprising an unsolicited SYN ACK packet and the second data packet comprising a reset (RST) packet.

10. The apparatus of claim 9, wherein the distributed director element is further operable to direct a client associated with the source to a mirrored service associated with a selected one of the round trip determinations.

11. The apparatus of claim 9, wherein the distributed director element is further operable to respond to a communication from a domain name server (DNS) by providing an Internet Protocol (IP) address of a mirrored service associated with a selected one of the mirrored websites.

12. The apparatus of claim 9, further comprising:

one or more director response protocol agents coupled to the distributed director element and operable to return one or more of the round trip determinations to the distributed director element.

13. The apparatus of claim 12, wherein one or more of the director response protocol agents are operable to communicate a probe to an approximate location of the source in order to assist in making one or more of the round trip determinations.

14. The apparatus of claim 13, wherein the probe comprises one or more packets that are generally used to establish a connection between two points in a network.

\* \* \* \* \*